US011802622B2

(12) United States Patent
Meister et al.

(10) Patent No.: US 11,802,622 B2
(45) Date of Patent: Oct. 31, 2023

(54) SHAFT SEAL, IN PARTICULAR RADIAL SHAFT SEAL

(71) Applicant: KACO GmbH + Co. KG, Kirchardt (DE)

(72) Inventors: Dieter Meister, Möckmühl (DE); Peter Wagner, Ludwigsburg (DE)

(73) Assignee: KACO GmbH + Co. KG, Kirchardt (DE)

(*) Notice: Subject to any disclaimer, the term of this patent is extended or adjusted under 35 U.S.C. 154(b) by 0 days.

(21) Appl. No.: 17/513,999

(22) Filed: Oct. 29, 2021

(65) Prior Publication Data
US 2023/0138015 A1 May 4, 2023

(51) Int. Cl.
*F16J 15/3204* (2016.01)

(52) U.S. Cl.
CPC .................. *F16J 15/3204* (2013.01)

(58) Field of Classification Search
CPC .... F16J 15/00; F16J 15/16; F16J 15/50; F16J 15/52; F16J 15/32; F16J 15/3204; F16J 15/3228; F16J 15/3236; F16J 15/3248; F16J 15/3252; F16J 15/3256; F16J 15/326; F16J 15/3264; F16J 15/3268

USPC .......................................................... 277/549
See application file for complete search history.

(56) References Cited

U.S. PATENT DOCUMENTS

| 4,218,813 | A | * | 8/1980 | Cather, Jr. .......... | B25B 27/0028 29/464 |
| 5,013,050 | A | * | 5/1991 | Curtis .................. | F16J 15/3268 29/464 |
| 8,919,782 | B2 | * | 12/2014 | Berdichevsky ...... | F16J 15/3244 277/549 |

* cited by examiner

*Primary Examiner* — Nathan Cumar
(74) *Attorney, Agent, or Firm* — Gudrun E. Huckett

(57) ABSTRACT

A shaft seal, in particular a radial shaft seal, has a seal element that is provided with a seal section that under elastic deformation contacts the outer side of a mounting sleeve. The shaft seal has a grease ring located on the mounting sleeve wherein the grease ring is arranged axially adjacent to the free end of the seal section on the mounting sleeve. For installation, grease ring and seal section are pushed by a mounting tool onto the shaft and the seal section on the shaft is pushed onto the grease ring in such a way that the grease of the grease ring is distributed between the seal section and the shaft.

8 Claims, 5 Drawing Sheets

SHAFT SEAL, IN PARTICULAR RADIAL SHAFT SEAL

BACKGROUND OF THE INVENTION

The invention concerns a shaft seal, in particular a radial shaft seal, with a seal element that comprises a seal section that under elastic deformation contacts the outer side of a mounting sleeve, and with a grease ring located on the mounting sleeve.

The invention concerns a method for installation of this shaft seal, in particular radial shaft seal.

Shaft seals are subjected to a seal-tightness test by means of an air leakage test after installation. It is determined thereby whether the required sealing action is ensured. Sometimes, the seal elements are not air-tight so that an air leakage test, despite correct installation, would cause an error message. For this reason, a grease is employed that is applied onto the seal section of the seal element before the shaft seal is pulled onto a mounting sleeve. The grease seals the region between the seal section and the shaft even when the seal element itself is not comprised of an air-tight material. At the customer, the shaft seal is pulled off the mounting sleeve onto the shaft. Since the seal grease is already located on the seal section, a new distribution of the applied grease at the seal section occurs when pushing the shaft seal onto the shaft. Due to this double distribution of the applied grease, there are again and again unfavorable distributions of the applied grease which has the result that such shaft seals, despite correct installation, are indicated as errors because they do not pass the air leakage test.

Therefore, it is the object of the invention to design the shaft seal in such a way that a reliable testing in respect to air passage is ensured.

SUMMARY OF THE INVENTION

This object is solved according to the invention in that the grease ring is applied axially adjacent to the free end of the seal section on the mounting sleeve.

This object is further solved by a method for installation of the disclosed shaft seal in which the shaft seal is pulled off the mounting sleeve and pushed onto the shaft, wherein the grease ring is applied axially adjacent to the free end of the seal section of the seal element onto the mounting sleeve, and wherein the grease ring and the seal section are pushed by a mounting tool onto the shaft and the seal section on the shaft is pushed in such a way onto the grease ring that the grease of the grease ring is distributed between the seal section and the shaft.

In the shaft seal according to the invention, the grease ring is not applied onto the seal section but axially adjacent to the free end of the seal section on the mounting sleeve. When therefore the shaft seal is pushed onto the mounting sleeve, there is no distribution of the grease yet that is applied only once the shaft seal has been pulled onto the mounting sleeve. Only once the shaft seal upon installation in an apparatus is pushed off the mounting sleeve onto the shaft, the seal section of the shaft seal moves onto the grease ring so that, upon displacement of the shaft seal on the shaft into the installation position, the grease is uniformly distributed below the seal section. In this way, in a simple manner it is achieved that the region between the seal section and the shaft is sealed properly by the grease and the subsequent air leakage test is passed even when at least the seal section itself is not air-tight.

Not only greases are to be understood as greases but also other media such as oils, resins or the like. Only for reasons of simplification, greases or grease rings is used herein.

The grease ring is applied in a preferred manner in such a way onto the mounting sleeve that it contacts the end face of the seal section. In this way, it is ensured that, upon displacement of the shaft seal on the shaft, the grease is distributed reliably and uniformly below the seal section.

For a reliable air leakage test, it is advantageous when the grease ring extends about the circumference of the mounting sleeve, i.e., forms a closed ring. Then, by displacement of the shaft seal on the shaft, the grease is uniformly distributed about the circumference of the shaft below the seal section.

The grease ring is positioned in a preferred embodiment in a radial plane of the mounting sleeve. This also contributes to the grease being uniformly distributed about the circumference during the displacement process of the shaft seal on the shaft.

In the method according to the invention, after pushing the shaft seal onto the mounting sleeve, the grease ring is applied axially adjacent to the free end of the seal section. For installation of the shaft seal, subsequently the shaft seal is pushed by means of a mounting tool off the mounting sleeve and onto the shaft. In doing so, the grease ring which is located axially adjacent to the free end of the seal section is first pushed onto the shaft prior to the seal section subsequently reaching the shaft. In this context, the seal section is pushed across the grease ring, which is already present on the shaft, so that, upon subsequent displacement of the shaft seal into the installation position, the grease is distributed uniformly between the seal section and the shaft. It is thus ensured that the subsequent air leakage test will be passed.

So that the seal section can reliably move onto the grease ring, the seal section in a preferred embodiment is elastically expanded when passing from the mounting sleeve onto the shaft. Since the grease ring in the push-on direction is located in front of the seal section of the shaft seal, in this manner the seal section is moved reliably onto the grease ring already present on the shaft so that the grease is uniformly distributed upon further displacement of the shaft seal.

The subject matter of the application results not only from the subject matter of the individual claims but also from all specifications and features disclosed in the drawings and the description. They are claimed as important to the invention, even if they are not subject matter of the claims, inasmuch as individually or in combination they are novel in relation to the prior art.

Further features of the invention result from the additional claims, the description, and the drawings.

BRIEF DESCRIPTION OF THE DRAWINGS

The invention will now be explained in more detail with the aid of an embodiment illustrated in the drawings.

DESCRIPTION OF PREFERRED EMBODIMENTS

Figure 5:
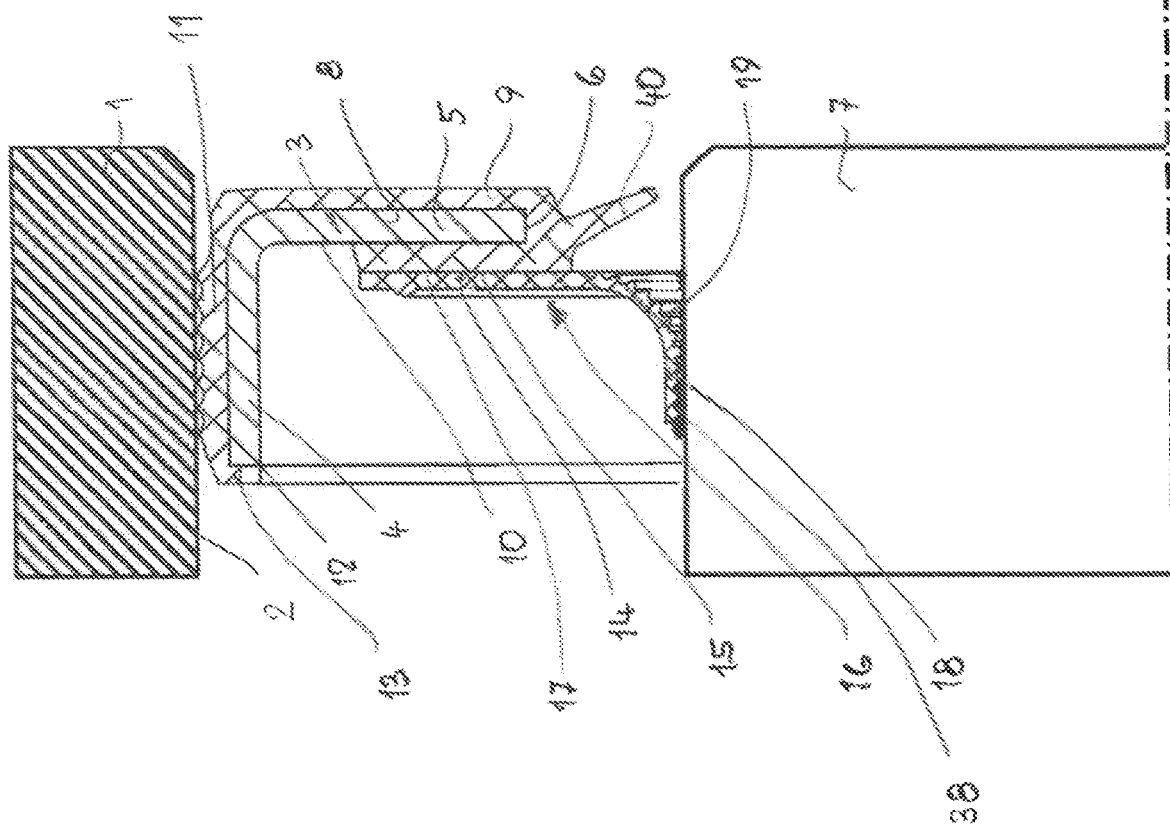
FIG. 5 shows a fourth step for installation of the shaft seal in an apparatus.

The shaft seal described in the following is advantageously a radial shaft seal that is installed in an apparatus 1 (FIG. 5). It has an installation opening 2 in which the shaft seal is seated.

The shaft seal has a carrier 3 which in axial section is L-shaped and comprises a cylindrical wall 4 that passes at a right angle into a radially inwardly extending bottom 5. It has a central opening 6 in which or through which a shaft 7 is extending.

The outer side 8 of the bottom 5 is surrounded at least partially by an envelope 9 that is comprised of elastomeric material and attached in a suitable manner to the carrier 3.

The envelope 9 in the region of the bottom 5 is advantageously embodied such that it extends across the rim of the opening 6 to the inner side 10 of the bottom 5.

The envelope 9 at the outer side passes advantageously into a cover 11 that covers the wall 4 of the carrier 3 at least across a portion of its axial width. In the installation position illustrated in FIG. 5, the cover 11 forms the static sealing action of the shaft seal. Advantageously, the side of the cover 11 which is facing the wall of the installation opening 2 is provided with a corrugated profiling 12 that, when pressing the shaft seal into the installation opening 2, is elastically deformed and ensures a proper static sealing action in this way.

Advantageously, the cover 11 also covers the free end face 13 of the wall 4 at least partially. The region 14 of the envelope 9 that covers the bottom 5 at the inner side 10 has an outer side 15 at which the seal element 16 is fastened. In the embodiment, the seal element 16 is an annular seal disk that is comprised advantageously of PTFE and is elastically deformed in the radial inner region in the illustrated installation position. The seal element 16 has the radially extending fastening section 17 which is fastened at the outer side 15 of the region 14 of the envelope 9.

The fastening section 17 of the seal element 16 is position preferably in a radial plane of the shaft seal and passes, steadily curved, into a seal section 18 that is elastically deformed in the installation position, surrounds the shaft 7, and is contacting the shaft 7 under a radial force. The seal section 18 can be provided at its side facing the shaft 7 with a return conveying structure 19.

Figure 1:
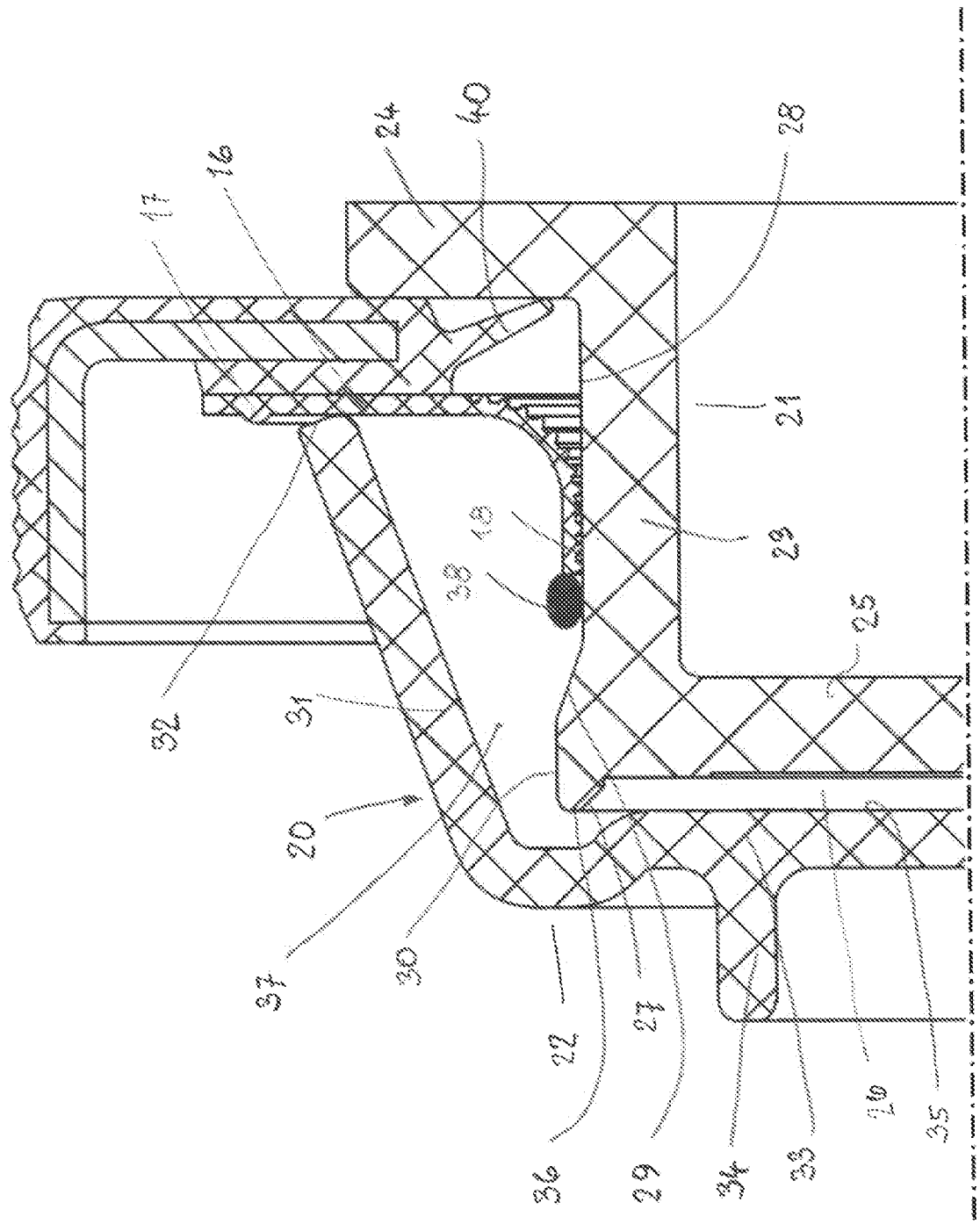
FIG. 1 shows in axial half section a shaft seal according to the invention and support unit.

The shaft seal is received prior to its installation in a support unit 20 (FIG. 1). It is comprised of a mounting sleeve 21 and a protection cap 22. The mounting sleeve 21 has a cylindrical wall 23 which at one end passes into a radially outwardly oriented annular flange 24 and at the other end passes into a radial bottom 25.

The annular flange 24 extends to the level of the bottom 5 of the carrier 3 of the shaft seal which is axially contacting the annular flange 24.

The bottom 25 of the mounting sleeve 21 is provided at its end face which is facing away from the annular flange 24 with a central recess 26. Its rim 27 is advantageously embodied so as to widen conically.

The cylindrical outer side 28 of the wall 23 is expanded in the region of the bottom 27 in regard to the diameter. Advantageously, the cylindrical outer side 28 passes by a cone section 29 into a cylindrical section 30 that has a greater diameter than the outer side 28.

The seal element 16 is positioned with its seal section 18 under radial pretension on the cylindrical outer side 28 of the mounting sleeve 21.

The protection cap 22 has a conical wall 31 which contacts with its free end 32 the fastening section 17 of the seal element 16. The wall 31 surrounds at a distance the wall 23 of the mounting sleeve 21.

The conical wall 31 of the protection cap 22 passes into a radially extending bottom 33 which is provided at its side facing away from the mounting sleeve 21 with a circumferentially extending projection 34. The bottom 33 of the protection cap 22 is designed in an exemplary fashion such that its inner side 35 facing the mounting sleeve 21 is positioned at the level of the end face 36 of the bottom 25 of the mounting sleeve 21.

The mounting sleeve 21 and the protection cap 22 delimit an annular receiving space 37 in which the seal section 18 as well as most of the fastening section 17 of the seal element 16 are accommodated in a protective way. The remainder of the shaft seal projects past the mounting sleeve 21 and the protection cap 22.

When the shaft seal is to be installed, a seal-tightness test by means of an air leakage test is performed. In this context, it is tested whether the shaft seal seals properly. For the leakage test, a grease 38 is used that, after pulling the shaft seal onto the mounting sleeve 21, is applied immediately in front of the free end of the seal section 18 onto the outer side 28 of the wall 23. The grease 38 is applied in front of the seal section 18 in an annular shape (grease ring) onto the outer side 28 of the wall 23 (FIG. 1). The grease (ring) 38 is located on the cylindrical outer side 28 of the wall 23 and advantageously at a minimal distance away from the cone section 29. During transport of the shaft seal, the protection cap 22 protects the grease 38 located on the mounting sleeve 21.

Figure 2:
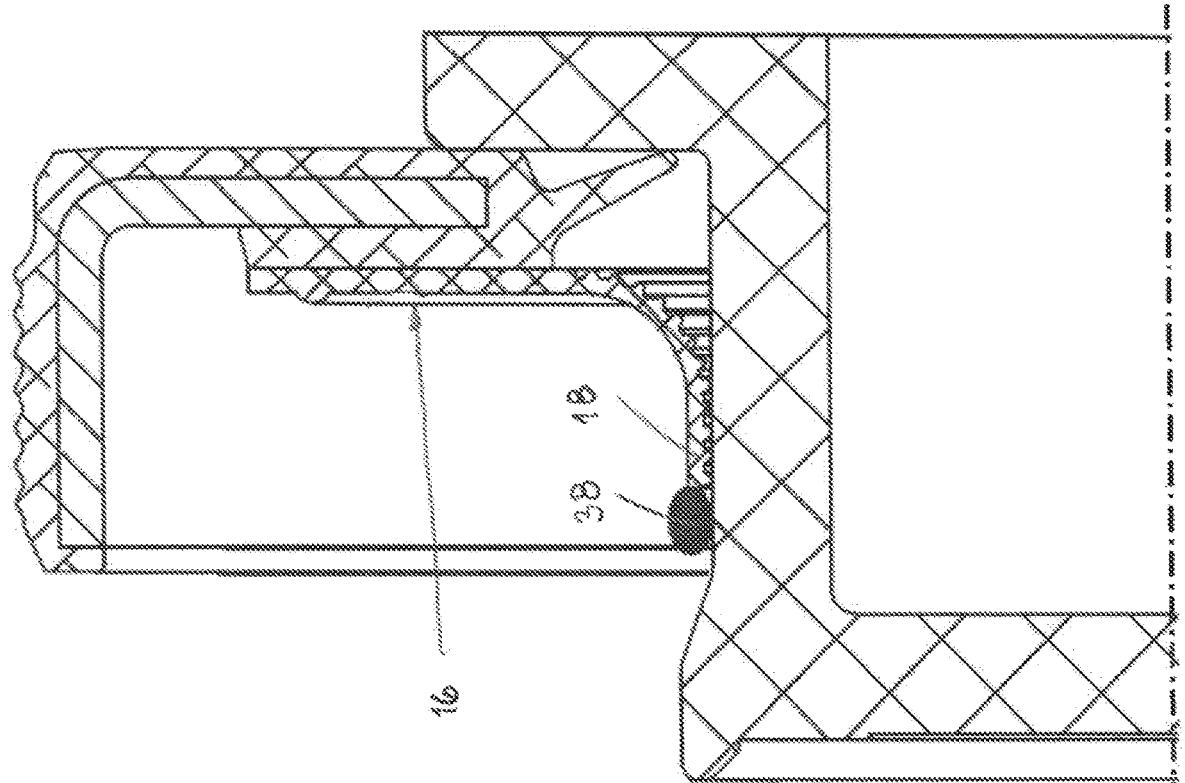
FIG. 2 shows a first step for installation of the shaft seal in an apparatus.

For installation of the shaft seal in the apparatus 1, first the protection cap 22 is removed that is gripped at the annular projection 34 by a corresponding mounting tool and can be easily axially removed (FIG. 2). Now the grease ring 38 with the seal section 18 of the seal element 16 is exposed.

The grease 38 must reach the area below the seal section 18 when the air leakage test is performed. This is achieved in the subsequently disclosed manner upon removing the mounting sleeve 21 from the shaft seal.

Figure 3:
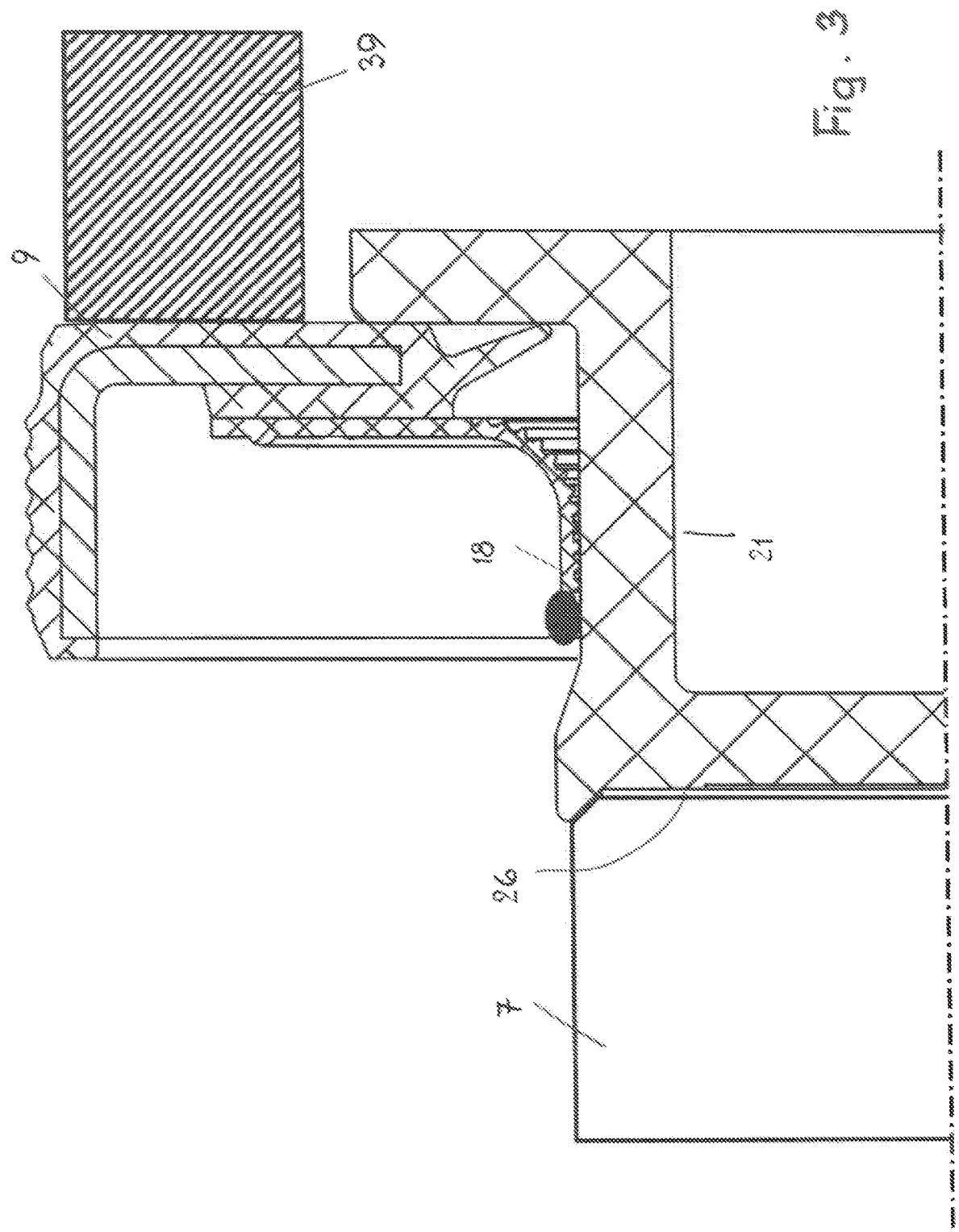
FIG. 3 shows a second step for installation of the shaft seal in an apparatus.

By means of a mounting tool 39, the installation of the shaft seal in the apparatus 1 is carried out. With the mounting tool 39, the shaft seal is moved with the mounting sleeve 21 axially against the shaft 7 (FIG. 3). The mounting tool 39 engages the part of the envelope 9 projecting past the mounting sleeve 21. With the mounting tool 39, the shaft seal with the mounting sleeve 21 is contacted at the end face of the shaft 7 that engages with its free end the recess 26.

Figure 4:
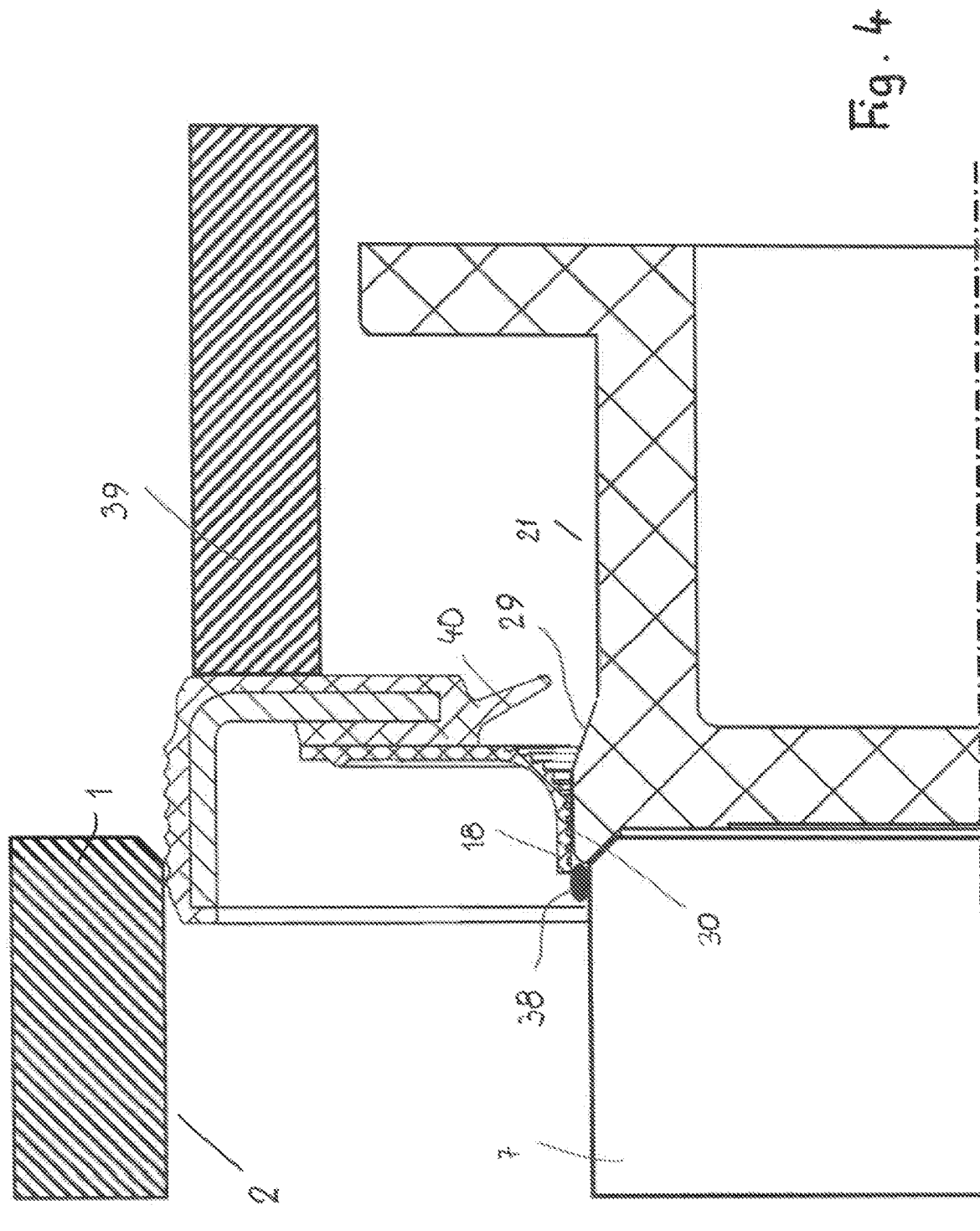
FIG. 4 shows a third step for installation of the shaft seal in an apparatus.

Upon further displacement with the mounting tool 39, the shaft seal is pulled off the mounting sleeve 21 and axially pressed into the installation opening 2 of the apparatus 1. The seal section 18 and the grease 38 positioned in front of it are moved across the cone section 29 of the mounting sleeve 21 so that the seal section 18 is radially expanded. The outer diameter of the cylindrical wall section 30 of the mounting sleeve 21 is larger than the outer diameter of the shaft 7 so that the seal section 18 reaches properly the shaft 7 (FIG. 4). The grease 38 is pushed in this context by the seal section 18 past the cone section 29 and the cylindrical wall section 30 onto the shaft 7.

As soon as the seal section 18 rests completely on the shaft 7, the mounting sleeve 21 can be removed. With the mounting tool 39, the shaft seal is pushed farther into the installation opening 2 of the apparatus 1 into its installation position. During this displacement process, the seal section 18 moves onto the grease ring 38 so that the latter is distributed below the seal section 18 (FIG. 5). This distribution process is favored in that the outer diameter of the wall section 30 of the mounting sleeve 21 is greater than the outer diameter of the shaft 7. This has the result that during the assembly process first the grease ring 38 reaches the shaft 7 while the seal section 18 is still located on the cylindrical wall section 30 of the mounting sleeve 21 (FIG. 4).

Upon displacement of the seal section 18 by the mounting tool 39, the seal section 18 moves onto of the grease ring 38 which has the result that the grease 38 is distributed uniformly between the shaft 7 and the seal section 18 when the seal section 18 is displaced on the shaft 7 into its installation position.

The grease 38 seals the region between the seal section 18 and the shaft 7 reliably so that the subsequent air leakage test is passed reliably.

Moreover, the grease 38 has the advantage that pressing the shaft seal into the installation opening 2 of the apparatus 1 and the running-in process of the seal section 18 are facilitated.

The described method is particularly advantageous when the seal element 16 is formed by a PTFE disk. It is not air-tight in the new state so that in case of an air leakage test, despite proper installation, an error message would be produced because the air would pass through between the seal section 18 and the shaft 7. Due to the described method, the grease 38 uniformly moves below the seal section 18 so that the region between the seal section 18 and the shaft 7 is properly sealed against air passage during the air leakage test.

The described configuration and assembly can be used, of course, also for seal elements that are comprised of other materials, for example, of the rubber-type material.

As grease 38, the greases are conceivable which are conventionally used in such air leakage tests, for example, greases with rheopex or thixotropic properties. In principle, in addition to greases, also other suitable media are conceivable, for example, oils, resins or the like. These other media can also have rheopex or thixotropic properties.

In the illustrated embodiment, the radial shaft seal is provided additionally with a dust lip 40 which however is not mandatory. It is advantageously formed as one piece together with the envelope 9 and surrounds the shaft 7 at a minimal radial distance. The dust lip 40 is engaged across during transport of the shaft seal by the radial flange 24 of the mounting sleeve 21 and is thus protected (FIG. 1).

What is claimed is:

1. A shaft seal assembly comprising:
   a shaft seal comprising a seal element, wherein the seal element comprises a seal section;
   a mounting sleeve, wherein the seal section contacts with elastic deformation an outer side of the mounting sleeve;
   a grease ring arranged axially adjacent to a free end of the seal section on the mounting sleeve, wherein the grease ring is a seal material for an air leakage test of the shaft seal.

2. The shaft seal assembly according to claim 1, wherein the grease ring contacts an end face of the free end of the seal section.

3. The shaft seal assembly according to claim 1, wherein the grease ring extends about an outer circumference of the mounting sleeve.

4. The shaft seal assembly according to claim 1, wherein the grease ring is positioned in a radial plane of the mounting sleeve.

5. A method for installation of a shaft seal on a shaft, the method comprising:
   positioning a seal element comprising a seal section on a mounting sleeve so that the seal section contacts with elastic deformation an outer side of the mounting sleeve;
   subsequently applying a grease ring axially adjacent to a free end of the seal section of the seal element onto the mounting sleeve;
   pushing the grease ring and the seal section by a mounting tool onto the shaft and, by pushing the seal section onto the grease ring, distributing grease of the grease ring between the seal section and the shaft; and
   using the grease distributed between the seal section and the shaft for sealing the shaft seal during an air leakage test.

6. The method according to claim 5, comprising expanding the seal section elastically upon passing from the mounting sleeve onto the shaft.

7. A shaft seal assembly comprising:
   a shaft seal comprising a seal element, wherein the seal element comprises a seal section;
   a mounting sleeve, wherein the seal section contacts with elastic deformation an outer side of the mounting sleeve;
   a grease ring arranged axially adjacent to a free end of the seal section on a section of the mounting sleeve, wherein the grease ring is a seal material for an air leakage test of the shaft seal;
   wherein the section of the mounting sleeve comprises an outer diameter widening in a displacement direction of the seal element on the mounting sleeve for mounting on a shaft such that the outer diameter of the mounting sleeve at an end configured to face the shaft in the displacement direction is larger than an outer diameter of the shaft.

8. A method for installation of a shaft seal on a shaft with a shaft seal assembly according to claim 7, the method comprising:
   pushing the grease ring and the seal section by a mounting tool from the mounting sleeve onto a shaft in a displacement direction, including:
      pushing first the grease ring off the mounting sleeve onto the shaft, and,
      upon pushing the seal section further in the displacement direction,
         expanding elastically the seal section on the mounting sleeve,
         moving the seal section off the mounting sleeve on top of the grease ring on the shaft, and
         distributing grease of the grease ring between the seal section and the shaft upon displacement of the shaft seal into an installation position.

* * * * *